Nov. 9, 1965  D. A. GIRARD  3,216,683

TUBE CLAMPS FOR MULTIPLE TUBE LAYERS

Filed March 10, 1964  2 Sheets-Sheet 1

Nov. 9, 1965      D. A. GIRARD      3,216,683

TUBE CLAMPS FOR MULTIPLE TUBE LAYERS

Filed March 10, 1964      2 Sheets-Sheet 2

United States Patent Office 3,216,683
Patented Nov. 9, 1965

3,216,683
TUBE CLAMPS FOR MULTIPLE TUBE LAYERS
Donald A. Girard, 10633 Charbono Way,
Rancho Cordova, Calif.
Filed Mar. 10, 1964, Ser. No. 350,770
16 Claims. (Cl. 248—68)

The invention relates to tube clamps suitable for fastening a plurality of layers of tubes to a structure, and to a connection between such a plurality of tube layers and a structure, such as a stationary supporting structure.

Tubes carrying fluid or electrical wires are often installed in parallel; they may be all of the same or of different sizes. To obviate the need for providing a large variety of clamps, suitable for securing various combinations of tubes differing as to numbers and sizes, and to facilitate the use of short supporting structures with a minimum of hold-down bolts, I have heretofore invented rigid tube clamps which can be formed of identical external outlines (save for the numbers and sizes of the tube-receiving recesses) and mounted in interlocking relation so that their bolt holes, formed in bolting lugs, can be brought into alignment. Such clamps are disclosed in my copending application Serial No. 268,495, filed March 27, 1963, now Patent No. 3,180,598.

Although it is possible to mount any desired number of rows of such blocks, and thereby to secure more than one layer of tubes situated at different distances from a transverse structure, such use of the blocks has certain drawbacks. It was necessary to provide exceedingly long hold-down bolts, which had to extend through all blocks. For example, in the preferred use of such blocks, two rows of terminally juxtaposed blocks, with the recesses of opposed blocks facing each other, are used to clamp one layer of tubes, and four rows would be required to clamp two layers. Apart from the difficulty of maintaining four layers of clamps in position before inserting the bolts, this made it necessary for the blocks of the outer two rows to be of the same lengths as those of the inner rows.

To effect further economy in space, it would be desirable in many installations to arrange the clamped tubes in a plurality of layers situated at different distances from the structure and to secure completely at least some of the tubes of the inner layer and their clamping blocks before clamping the tubes more distant from the structure.

Moreover, when tubes are mounted in different layers, it is often convenient to group all large-diameter tubes in one layer and the small-diameter tubes in another. This would make it possible to include a greater number of tubes in the latter layer and make it desirable to use clamps of lesser lengths in this layer.

Now according to the invention, a novel rigid base block having guide openings for hold-down members at its ends is provided which has auxiliary securing elements, such as threaded bolt holes, formed in the outer face thereof, by which additional or auxiliary clamping blocks can be attached. In the preferred embodiment, in which the tubes of larger diameters are to be clamped by the base blocks, the interval between said auxiliary securing elements is smaller than, e.g., one-half of, the interval between the guide openings. Further, these guide openings are preferably counter bored, so as to receive hold-down bolts in recessed relation to the base blocks, thereby to present a substantially plane abutment face when secured to the structure.

The block is preferably also wider than the auxiliary blocks to be mounted "piggy-back" thereon. For the sake of reducing the weight, the base blocks may be hollowed out. Hollowing out the block from the inner face thereof, leaving spaced walls extending longitudinally, e.g., along the block edges (transversely to the tubes clamped thereby) leaves concave tube-engaging bands or surfaces at the wall edges; these bands are spaced along the axis of the tube and secure the tube more advantageously than continuous surfaces extending between the block side walls, in that the clamping action is localized along narrow bands, providing two separate clamping zones and leaving the tube free from the block between the said bands.

The novel connection comprises at least one and, preferably, two rows of terminally juxtaposed base blocks engaged to the structure with opposed blocks positioned with their recesses directed toward each other, and at least one and, preferably, two rows of terminally juxtaposed auxiliary blocks similarly mounted with mutually facing recesses and clamped to the base blocks, the several tubes being clamped within the holes defined by the opposed recesses. Any desired number of blocks may be terminally juxtaposed in accordance with the number of tubes.

For the sake of minimizing the inventory of types of clamping blocks, all base blocks are advantageously of like construction (save for the size of their recesses), although the securing elements or holes for fastening the auxiliary blocks are not used in the row immediately adjacent to the structure. Similarly, all auxiliary blocks may be of like construction (again, save for the recesses). While the auxiliary blocks may be identical to the base blocks—every other auxiliary securing element or hole in the base blocks being then used—it is preferred to use smaller auxiliary blocks, for example, the number of auxiliary blocks, when half as long as the base blocks, may be one less than twice the number of base blocks.

It is evident that the above-mentioned principle may be extended to secure more than two layers of tubes, by fastening additional rows, e.g., a fifth and a sixth row of auxiliary blocks to the fourth row. The blocks of the fourth row must, in such case, have auxiliary securing elements and are constructed as described above for the base blocks. Except for this situation, it is not necessary that the auxiliary blocks have auxiliary securing elements, nor need their bolt holes be counter bored.

Preferably, all blocks have ends of complementary shapes, so that they can be terminally juxtaposed in interlocked relation, and the guide openings or bolt holes are formed in bolting lugs that have a combined thickness equal to that of the block and are staggered in relation to the block faces, as in the earlier invention, described in the aforesaid Patent No. 3,180,598.

The invention will be further described with reference to the accompanying drawing forming a part hereof, showing two embodiments, wherein.

Figure 1:
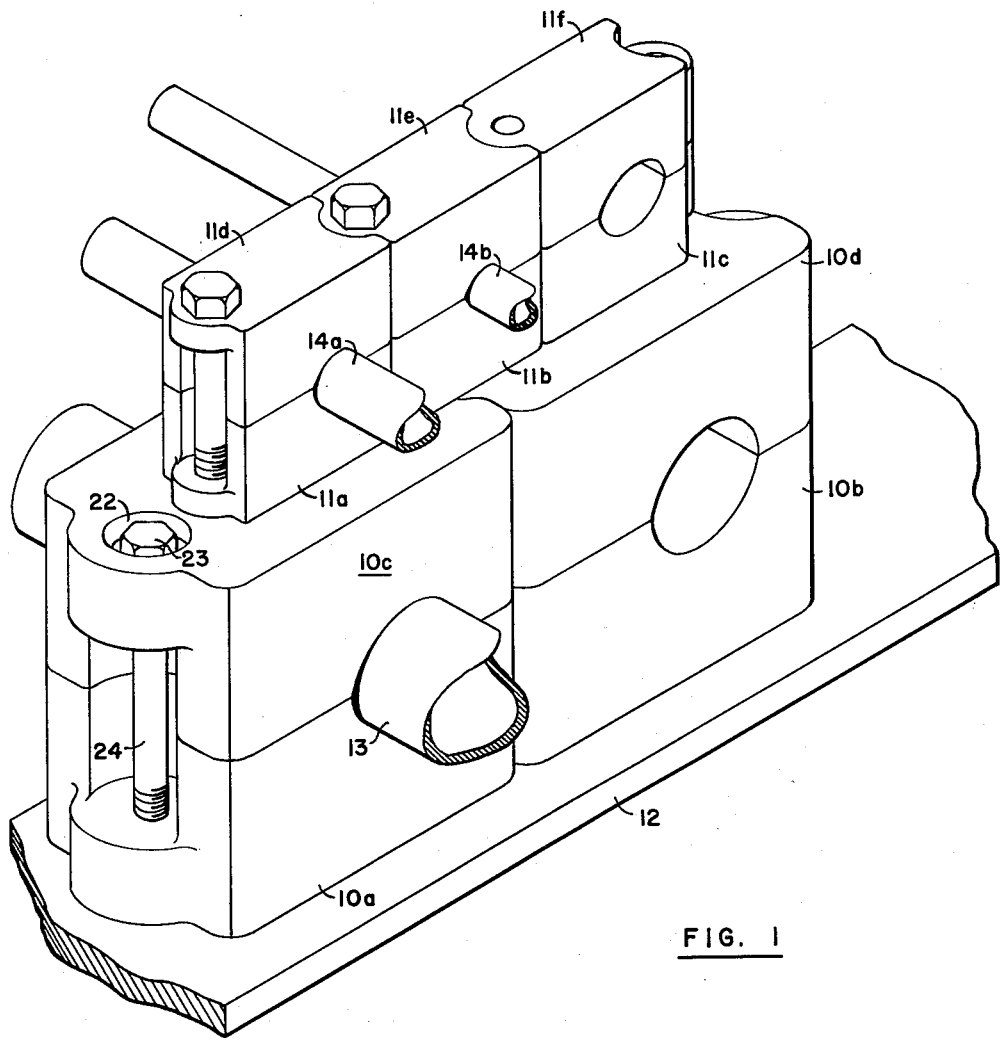
FIGURE 1 is an isometric view of a connection according to the invention, certain tubes and bolts being omitted for clarity.
Figure 2:
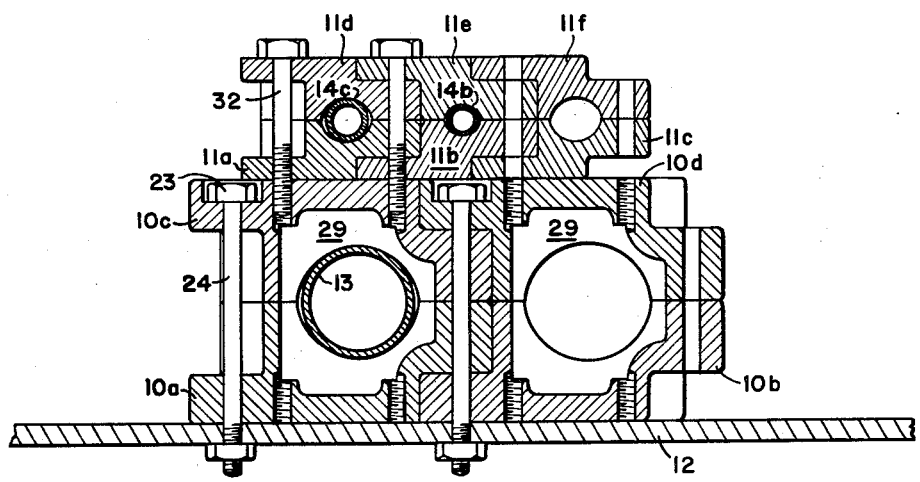
FIGURE 2 is a sectional view, taken transversely to the clamped tubes, through the connection shown in FIGURE 1, drawn to a reduced scale.

Referring to FIGURES 1 and 2, the base fastening blocks 10a through 10d, together with smaller auxiliary blocks 11a through 11f, are used to secure to a structure 12, such as a support, a plurality of layers of parallel tubes situated at different distances from the structure and extending transversely thereto. Only one tube 13 of the near or inner layer appears, and only two tubes 14a and 14b of the far or outer layer appear. The tubes of each layer may be of the same or of different external diameters; thus, tube 14a is larger than tube 14b. The center lines of all tubes in one layer lie in a common plane. Preferably, all base blocks are of identical construction (save, when necessary, for the number and size of the tube receiving recesses) although it is not necessary that the blocks 10 and 10b in engagement with the structure have auxiliary bolting holes or counter bored bolt holes, to be described. Similarly, all auxiliary blocks may be of identical outlines, with a like possible exception regarding their tube-receiving recesses. In the preferred embodiment shown, the auxiliary blocks are narrower and half as long as the base blocks, although these are not essential requirements.

Figure 3:
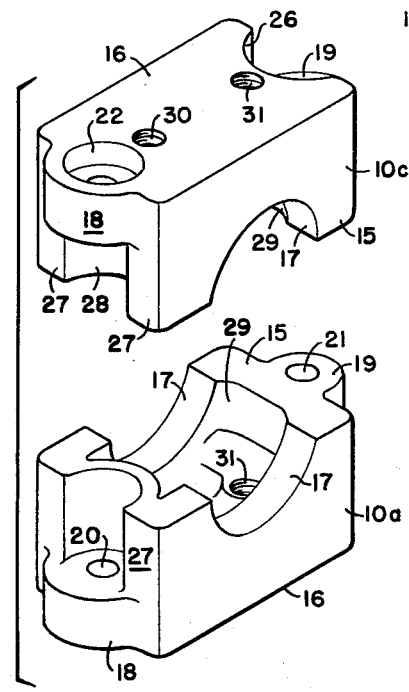
FIGURE 3 is an exploded view of two identically shaped base blocks, one being inverted relatively to the other, to show their operative relation for clamping a tube.

A pair of oppositely directed base fastening blocks 10a and 10c is shown in FIGURE 3, the block 10c being further illustrated in FIGURES 4–7. Each block is rigid and has an inner abutment face 15 and an outer abutment face 16 which faces are, in this embodiment, parallel and flat. The blocks may, for example, be of cast metal, but other materials or composite structures affording rigidity may be used. The face 15 has formed therein an open transverse, tube-receiving recess 17, which may have a cylindrical surface generated by a generatrix which is perpendicular to the drawing (FIGURE 4) and moves on a directrix which is the arc of a circle of radius R and center O. This center lies outside of the plane of the face 15 by a small eccentricity $e$ which is, for example, between 0.005 and 0.10 times R. R is slightly longer than the radius of the tube to be clamped, for example, between 1.001 and 1.10 times the tube radius, depending upon the selected value of $e$ and the extent to which the tube is to be crushed or deformed during clamping.

By way of a specific example, for clamping a tube of soft metal, such as copper, having an external diameter of 0.501 inch, which is to be crushed 0.0085 inch, R may be 0.260 inch and $e$ 0.014 inch.

The preferred shape of the recess 17 is in conformity with the said earlier invention and not essential to the present invention.

Figure 4:
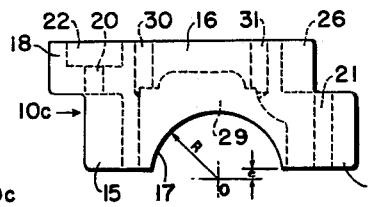
FIGURE 4 is an elevation of one base block.
Figure 6:
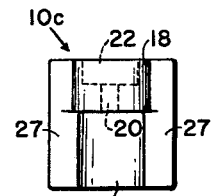
FIGURES 6 and 7 are end views of the left and right ends, respectively, of the block shown in FIGURE 4.
Figure 5:
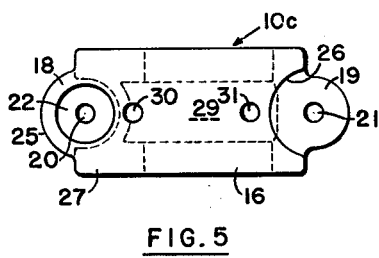
FIGURE 5 is a plan of the block of FIGURE 4.
Figure 7:
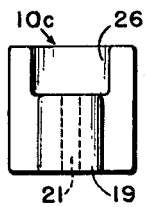

The opposed ends of the block are advantageously of complementary shapes. Thus, as shown, each block has at each end an integrally formed bolting lug or ear 18 or 19, each of thickness less than that of the block and staggered relatively to the abutment faces, so that the lug 18 is flush with the outer face 16 and the lug 19 flush with the inner face 15. Further, the combined thickness of the two lugs is advantageously equal to the thickness of the block, so that stress loading is transmitted through the several overlapping lugs, as will appear. Each lug has a guide opening, such as a bolt hole 20 or 21. The hole 20 is counter bored at the face 16, as shown at 22, to receive the head 23 of a hold-down member, such as a bolt 24, without upward protrusion beyond the face 16. As appears in FIGURES 5 and 6, the lug 18 is curved convexly at its outer end 25. As appears in FIGURES 4, 5 and 7, there is formed in the face 16, at the end thereof remote from the lug 18, a recess 26 having a flat bottom and a concavely curved end wall, shaped to receive a lug 18 from a terminally juxtaposed block of like outline. The lug 19 is narrower than the block. As shown in FIGURES 4, 5 and 6, the block has, at its end remote from the lug 19, a pair of laterally spaced projections 27 which extend vertically from the face 15 to the lug 18 and define between them an open recess 28, shaped to receive a narrow lug 19 from a terminally juxtaposed similar block. The recesses 26 and 28 thus cooperate with the lugs of terminally juxtaposed blocks to cause the several blocks of a series to be interlocked. This prevents lateral displacement of individual intermediate blocks although they are unbolted.

Usually but a single tube-receiving recess 17 is formed in each block. However, several such recesses may be provided in one block. It may be noted that when single recesses are used, they are normally and preferably situated off-center, nearer the hole 21 than the hole 20. Apart from producing a stronger structure, having regard to the fact that the recess 28 extends inwardly beyond the axis of the hole 20, this off-center location makes it possible to guard against incorrect installation. Thus, an upper block of a series as shown in FIGURES 1 and 2 cannot be reversed end-to-end into improper relation to the lower block with its recess 17 engaged to a tube and its bolting holes aligned with those of the lower block. It is evident that the recesses 17 may have other shapes and that their tube-engaging surfaces need not be continuous.

Each base block may be hollowed out to reduce its weight, as shown at 29, whereby the surfaces of the recesses 17 that engage the tubes are narrow bands, formed in the edges of longitudinal walls that are spaced apart transversely to the block as appears in the lower half of FIGURE 3. These bands are spaced apart along the axial direction of the tube clamped thereby and permit a greater pressure to be applied to the tube for a given force on the hold-down bolts 24, leading to improved gripping action. Thus, separate gripping actions occur at axially spaced clamping zones of the tube, and the tube is isolated from the block save at said zones.

According to the invention each base block has formed on its outer face 16 a pair of auxiliary securing elements, embodied in the block shown as internally threaded holes 30 and 31, spaced apart by a distance less than, e.g., one-half of the distance between the holes 20 and 21. These holes receive hold-down bolts 32 by which the auxiliary blocks are secured to the base blocks. Thus, one auxiliary block 11a is mounted wholly on a base block 10c and the next auxiliary block 11b spans two juxtaposed base blocks. It may be noted that it is not always essential to provide two holes 30 and 31 on the base block; one may suffice when the lengths of the auxiliary blocks is the same as that of the base blocks.

Figure 8:
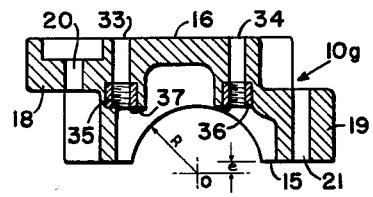
FIGURE 8 is a longitudinal sectional view through a block according to a modified embodiment.

In the modified construction shown in FIGURE 8, the base block 10g has an outline like that of the block 10c but differs in that the auxiliary securing elements are holes 33 and 34 having smooth bores, and internally threaded nuts 35 and 36 are secured within the block in alignment with the holes for engagement with the bolts 32. These nuts may be secured, for example, by upsetting or staking the block to form a lip 37 which retains the nut.

The auxiliary blocks 11a–11f have shapes as described for the base blocks and may be identical therewith. However, unless they are themselves to act as additional base blocks for an added course of auxiliary blocks, the holes 20 need not be counter bored and the auxiliary bolt holes 30 and 31 are not needed. In the preferred arrangement shown, the auxiliary blocks are one-half as large as the base blocks in all linear dimensions, so that their bolt holes in the bolting lugs thereof have intervals equal to the distances between auxiliary holes 30 and 31 on the same or on terminally juxtaposed base blocks.

In making a connection, the parts are assembled as shown in FIGURES 1 and 2, the base blocks being mounted and bolted before attaching the auxiliary blocks. As shown in the latter view, each bolt 24 or 32 extends through four lugs (except for the bolts at the ends of the rows), and stress imposed by the bolts is transmitted through the lugs.

I claim as my invention:

1. A rigid block for fastening one or more tubes to a supporting structure by means of hold-down members, said block having a pair of spaced faces and being formed with:

(a) a pair of guide openings at the ends thereof for receiving said hold-down members, (b) a transverse tube-receiving recess in one of said faces, and (c) a pair of auxiliary securing elements formed at the other of said faces and spaced apart by a distance less than the interval between said guide openings for securing additional hold-down members relatively to the block and thereby fastening to the latter face a similar auxiliary rigid block for fastening an additional tube.

2. A fastening block as defined in claim 1 wherein said guide openings are bolt holes which are recessed at the said other face to receive an enlargement on said hold-down member and said other face is shaped to abut a flat auxiliary block.

3. A fastening block as defined in claim 2 wherein said securing elements are internally threaded holes.

4. A fastening block as defined in claim 2 wherein said securing elements are holes extending inwardly from said other face, each hole having a threaded nut secured within the block in alignment with its hole.

5. A fastening block as defined in claim 2 wherein the interval between said securing elements is one-half of the interval between said bolt holes.

6. A fastening block as defined in claim 2 having the ends thereof formed with complementary shapes, so that a plurality of said blocks of identical outlines can be terminally juxtaposed in mating relation with the bolt holes of adjoining blocks in alignment, the interval between said auxiliary securing elements being one-half of the distance between said bolt holes, whereby the number of terminally juxtaposed auxiliary blocks that can be secured to a row of defined blocks is one less than twice the number of defined blocks in the row.

7. A fastening block as defined in claim 1 wherein said block is hollow from said one face, forming longitudinal walls spaced apart in said transverse direction, said recess being formed in the edges of said walls.

8. A connection between a plurality of parallel tubes extending transversely to and at different distances from a structure, which comprises:

(a) a first block as defined in claim 1 mounted in clamping engagement with a first tube near said structure on the tube side remote from the structure and secured to the structure by hold-down members extending through the guide openings thereof, and (b) an auxiliary block as defined in claim 1 through paragraph (b) thereof securing a second tube which is situated on the side of the first block remote from the structure, said auxiliary block being in clamping engagement with the second tube on the tube side remote from the structure and secured to said first block at said securing elements.

9. A connection between a plurality of layers of parallel tubes extending transversely to and at different distances from a structure, which comprises:

(a) a first row of terminally juxtaposed rigid blocks as defined in claim 1 through paragraph (b) thereof mounted on said structure with said recesses directed away from the structure, the tubes of the nearer layer being positioned partially within the said recesses, (b) a second row of terminally juxtaposed rigid blocks as defined in claim 1 mounted on said first row with the recesses thereof directed toward the structure and receiving parts of said nearer tubes, (c) hold-down members extending through the guide openings of said blocks securing the said two rows of blocks to the structure, (d) a third row of terminally juxtaposed auxiliary rigid blocks as defined in claim 1 through paragraph (b) thereof mounted on the second row of blocks with said recesses directed away from the structure, the tubes of the farther layer being positioned partially within the said recesses, (e) a fourth row of terminally juxtaposed auxiliary rigid blocks as defined in claim 1 through paragraph (b) thereof mounted on the third row of blocks with the recesses thereof directed toward the structure and receiving parts of said farther tubes, and (f) means securing said blocks of the third and fourth rows to the blocks of the second row and engaged to the securing elements thereof .

10. A connection between a plurality of layers of parallel tubes extending transversely to and at different distances from a structure, which comprises:

(a) a first row of terminally juxtaposed rigid blocks as defined in claim 6 mounted on said structure with said recesses directed away from the structure and receiving parts of the tubes of the nearer layer, (b) a second row of terminally juxtaposed rigid blocks as defined in claim 6 mounted on said first row with the recesses thereof directed toward the structure and receiving parts of said nearer tubes, (c) the blocks of each row being positioned with the bolt holes of adjacent blocks in alignment and the bolt holes of the two rows in mutual alignment, (d) a plurality of bolts extending through the aligned bolt holes and secured to the structure and securing said blocks to the structure firmly to clamp the near tubes between opposed blocks, (e) a third row of terminally juxtaposed auxiliary rigid blocks as defined in claim 1 through paragraph (b) thereof but having lengths about one-half of those of the blocks of the first two rows mounted on the second row with said recesses directed away from the structure, the tubes of the farther layer being positioned partially within the said recesses, (f) a fourth row of terminally juxtaposed auxiliary blocks as defined in claim 1 through paragraph (b) thereof and of lengths about one-half of those of the blocks of the first two rows mounted on the third row with the recesses directed toward the structure and receiving parts of said farther tubes, and (g) means securing said blocks of the third and fourth rows to the blocks of the second row and engaged firmly to the securing elements thereof to clamp the said farther tubes between opposed auxiliary blocks.

11. A connection as defined in claim 10 wherein the blocks of the third and fourth rows have the ends thereof formed with complementary shapes, and terminally juxtaposed blocks of said third and fourth rows are mounted with said guide openings at adjoining blocks in alignment, the guide openings of the fourth row being, further, in alignment with those of the third row.

12. A connection as defined in claim 11 wherein all blocks of the first and second rows are of identical outlines, and all blocks of the third and fourth rows are of identical outlines.

13. A connection as defined in claim 10 wherein said bolt holes are recessed in said other face of each block, and the said bolts have their ends remote from the structure situated wholly within said recessed bolt holes, all said blocks presenting planar abutment faces except for said recesses.

14. A block for fastening one or more tubes to a supporting structure by means of hold-down members, in cooperation with a similarly shaped, inverted block, comprising:

(a) a one-piece block of rigid material formed with a pair of spaced, generally parallel abutment faces, including an outer face adapted to abut said supporting structure and an inner face shaped to abut the inner face of said inverted, juxtaposed block of like shape, (b) said block having a pair of guide openings at the ends thereof for receiving hold-down members secured to and extending from said supporting structure, (c) said block being hollow inwardly from said inner face and having a pair of longitudinal, laterally spaced walls, (d) said longitudinal walls being formed with tube-receiving recesses in alignment transversely to the block, shaped to receive approximately one-half of a tube.

15. A block as defined in claim 14 wherein said longitudinal walls have edges situated in a plane which is common to said inner abutment face, and the said recesses intersect the said edges of the respective walls at both margins of the recesses, whereby said wall edges can engage corresponding edges of said similarly shaped block on both sides of said recesses.

16. A block for fastening one or more tubes to a supporting structure by means of hold-down members, in cooperation with a similarly shaped, inverted block, comprising:

(a) a one-piece metallic block formed with a pair of spaced, generally parallel abutment faces including an outer face adapted to abut said supporting structure and an inner face shaped to abut the inner face of an inverted, juxtaposed block of like shape, (b) said block having a pair of lugs situated respectively at the ends thereof, one being flush with the inner face and the other with the outer face, the combined thickness of said lugs being equal to the distance between said faces, whereby said block can be positioned in terminally juxtaposed relation to blocks of like shape with the lugs in overlapping relation, (c) said lugs having openings positioned for alignment with openings in lugs of terminally juxtaposed blocks and with openings in the lugs of said inverted block for receiving hold-down members secured to and extending from said supporting structure, (d) said block being hollow inwardly from said inner face and having a pair of longitudinal, laterally spaced walls flush with the outer sides of said block, (e) said longitudinal walls being formed with tube-receiving recesses in alignment transversely to the block, shaped to receive approximately one-half of a tube and presenting narrow bands for engaging said tube.

References Cited by the Examiner

UNITED STATES PATENTS

| | | | |
|---|---|---|---|
| 631,234 | 8/99 | Stevens | 248—67.5 |
| 896,709 | 8/08 | Bryce | 151—19 |
| 1,758,062 | 5/30 | Replogle | 85—32 |
| 2,171,322 | 8/39 | Rivard | 16—119 |
| 2,227,528 | 1/41 | Adler | 174—135 |
| 2,348,100 | 5/44 | Wadsworth | 174—84 |
| 2,362,124 | 11/44 | Ellinwood | 174—135 |
| 2,425,033 | 8/47 | Fletcher | 248—68 |
| 2,582,384 | 1/52 | Knollman | 248—65 X |
| 2,674,772 | 4/54 | Jacobs | 24—125 |

FOREIGN PATENTS 544,618   4/42   Great Britain.

CLAUDE A. LE ROY, *Primary Examiner.*